United States Patent [19]

Yamaguchi et al.

[11] Patent Number: 5,341,057
[45] Date of Patent: Aug. 23, 1994

[54] VIBRATOR MOTOR FOR A WIRELESS SILENT ALERTING DEVICE

[75] Inventors: Tadao Yamaguchi; Naohisa Koyanagi; Koichi Nakajima, all of Isesaki, Japan

[73] Assignee: Tokyo Parts Industrial Co., Ltd., Isesaki, Japan

[21] Appl. No.: 96,931

[22] Filed: Jul. 23, 1993

[30] Foreign Application Priority Data

Oct. 14, 1992 [JP] Japan .................. 4-301762

[51] Int. Cl.$^5$ .................. H02K 7/065; H02K 1/22
[52] U.S. Cl. .......................... 310/81; 310/261
[58] Field of Search ............ 310/40 MM, 80, 81, 261, 310/269; 340/311.1, 407

[56] References Cited

U.S. PATENT DOCUMENTS

| 3,584,249 | 6/1971 | Murphy | 310/81 |
| 4,812,692 | 3/1989 | Arita | 310/269 |
| 5,036,239 | 7/1991 | Yamaguchi | 310/81 |
| 5,057,731 | 10/1991 | Hancock | 310/261 |
| 5,107,155 | 4/1992 | Yamaguchi | 310/81 |
| 5,175,459 | 12/1992 | Danial et al. | 310/81 |

FOREIGN PATENT DOCUMENTS

| 0055561 | 2/1990 | Japan | 310/269 |
| 0193686 | 3/1991 | Japan | |
| 0153444 | 2/1992 | Japan | |
| 0294482 | 6/1992 | Japan | |
| 85/01620 | 4/1985 | U.S.S.R. | 310/81 |

Primary Examiner—R. Skudy
Assistant Examiner—Clayton E. LaBalle
Attorney, Agent, or Firm—Kenjiro Hidaka

[57] ABSTRACT

A dc vibrator motor has a generally cylindrically-shaped magnetically conductive case, a ring-shaped permanent field magnet, and an armature rotor including a shaft. The field magnet has at least four and at most eight alternate north and south pole sections arranged at an even angular pitch coaxially with the shaft. The armature rotor has at least three armature poles having an angular interval of 60° between adjacent poles and at most six armature poles having an angular interval of 30° between any pair of adjacent poles and at least six and at most twelve commutator segments arranged at an even angular pitch coaxially with the shaft. A pair of commutator brushes have an angular interval of at least 45° and at most 90°. Since all of the armature poles are situated within an angular range of 180° about the shaft, the center of mass of the rotor is radially off the shaft, thereby causing vibrations.

4 Claims, 5 Drawing Sheets

VIBRATOR MOTOR FOR A WIRELESS SILENT ALERTING DEVICE

BACKGROUND OF THE INVENTION

1. Field of the Invention

This invention relates to a self-vibrating dc micro motor used for a pocketable wireless silent alerting device. The motor does not nave an output shaft or an eccentric external weight, but its armature rotor has an eccentric mass distribution for creating vibration.

2. Description of the Prior Art

One of the prior known vibrator motors is shown in FIG. 5. In FIG. 5, a vibrator motor M2 has an output shaft S on which an eccentric weight W, made of a tungsten alloy etc., is mounted. However, some danger of mechanical interference pertains to this type of vibrator motor since the rotating eccentric weight is located outside the motor case. In addition, the alerting device requires an extra space in which the eccentric weight turns, and the high density material for the weight is costly.

As disclosed in U.S. Pat. No. 5,036,239 (issued Jul. 30, 1991), one of the present applicants invented a flat coreless dc vibrator motor having neither output shaft nor external weight. This motor has a rotor which incorporates generally sector shaped non-overlapping flat armature coils arranged angularly partially about the shaft of the rotor, so that the center of mass of the rotor is off the axis of the shaft of the rotor.

As disclosed in U.S. Pat. No. 5,107,155 (issued Apr. 21, 1992), the same applicant invented another dc vibrator motor having neither output shaft nor external weight. This motor has a cylindrically shaped coreless rotor mounted on a fixed shaft. The rotor has either eccentric bearings or a combination of eccentric bearings and eccentric weights, so that the center of mass of the rotor is off its rotational axis. Although the motor has been favorably accepted in the market, the cylindrically shaped coreless coils of this motor requires additional production steps.

The same applicant also proposed a vibrator motor having a shaft which is rigidly fixed to a housing, and an eccentric rotor mounted on the fixed shaft, as disclosed in the Japanese laid-open patent application, application No. 2-294482 (application date Oct. 31, 1990). In this motor, one of ordinarily three armature poles is deleted and the rotor has actually two armature poles angularly spaced at 120° each other. This motor has a large cogging effect and, therefore, requires a comparatively high voltage and large power consumption particularly for starting the motor in order to overcome the cogging effect. Such vibrator motor is less suitable for a battery-operated pocketable alerting device.

In a copending U.S. application, No. 08/056,369 (filed Apr. 30, 1993), assigned to the same assignee as of the present application, there is the disclosed a vibrator motor having a rotor whose mass is eccentrically distributed. FIG. 6 shows a section of this motor, which is referred to as M3. In FIG. 6, arcuate armature blades 1, each having an equal arcuate length, are angularly evenly disposed about a rotor shaft 2, but radially extending respective armature winding arms 3 are angularly unevenly arranged about the shaft 2. Furthermore, the gage and the number of turns of armature windings 4 are not all the same.

In order to minimize the cogging effect, the amount of the displacement of the center of mass of the rotor from the rotating axis has to be minimized. However, if the amount of the displacement of the center of mass of the rotor from the rotating axis is minimized, the amplitude of the vibration of the rotor will become undesirably small. On the other hand, if the rotational speed of the rotor is increased in order to compensate the low amplitude vibration, a high frequency vibration is produced and such high frequency vibration will be uncomfortably felt by the bearer of the paging unit.

SUMMARY OF THE INVENTION

It is therefore a primary object of the present invention to provide a small dc vibrator motor having a minimized cogging effect, which, therefore, can be operated on a low dc voltage.

It is another object of the present invention to provide a small dc vibrator motor having a large displacement of the center of mass of the rotor from its axis, whereby the motor produces a large amplitude but comparatively low frequency vibration.

In order to achieve the above objects, a dc vibrator motor of the present invention has a generally cylindrically-shaped magnetically conductive case and an armature rotor including a shaft rotatably supported by the case. A ring-shaped permanent field magnet is disposed inside the case coaxially with the shaft and fixedly attached to the case.

In the first embodiment of the present invention, the armature rotor has a total of three armature poles and windings. The armature poles are angularly arranged about the axis of the shaft in such a manner that there is an angular interval of 60° between the radial central axes of any adjacent pair of the armature poles. Therefore, the angular interval between the radial central axes of positionally the first and the third armature poles is 120°. The armature rotor further includes a commutator having six commutator segments arranged at an even angular pitch of 60°. The angular interval between a pair of commutator brushes is 90°.

The field magnet has four alternate north and south field magnetic pole sections arranged at an angular pitch of 90°.

In the second embodiment of the present invention, six armature poles and windings are provided at an angular pitch of 30° between any pair of armature poles adjacent to each other. Therefore, the angular interval between the radial central axes of positionally the first and the sixth armature poles is 150°. Twelve commutator segments are provided at an even angular pitch of 60°. The field magnet has eight alternate north and south field magnetic pole sections arranged at an even angular pitch of 45°. The angular interval between the pair of commutator brushes is 45°.

Since radial axes of all of the armature poles of the vibrator motor, in both the first and the second embodiments, are disposed angularly within 180° about the axis of the rotor shaft, the center of the mass of the rotor is situated radially substantially off the rotating axis. Thus, vibrations of a large amplitude is produced during the rotation of the rotor. On the other hand, since the field magnet has at least four alternate north and south pole sections, the cogging effect is minimized, and, therefore, a comparatively small cogging torque is required to drive the motor. This means that a low voltage power can operate the motor.

DETAILED DESCRIPTION OF THE PREFERRED EMBODIMENTS

The invention will now be described in detail with reference to the drawings.

Figure 1:
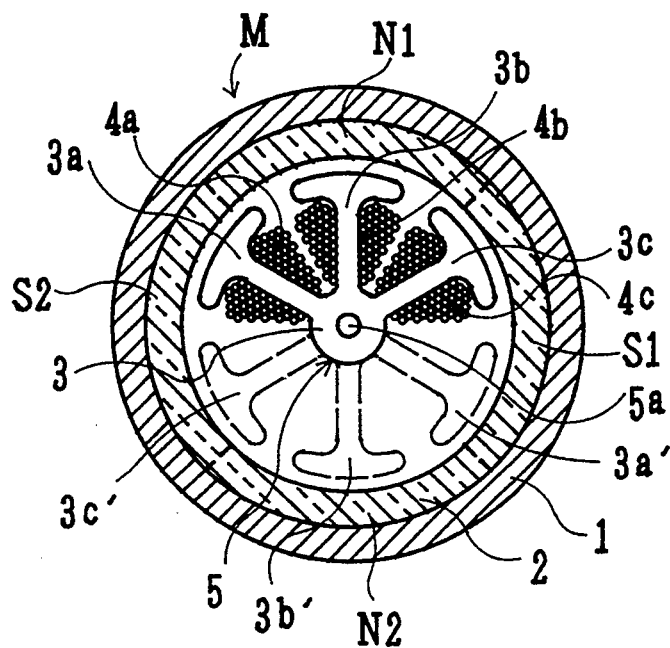
FIG. 1(a) is a diametrical cross-sectional view of a micro vibrator motor of a first embodiment according to the present invention.
FIG. 1(b) is another diametrical cross-sectional view of the micro vibrator motor shown in FIG. 1(a), particularly showing angular configurations of its armature poles and pole sections of the field magnet.
Figure 1:
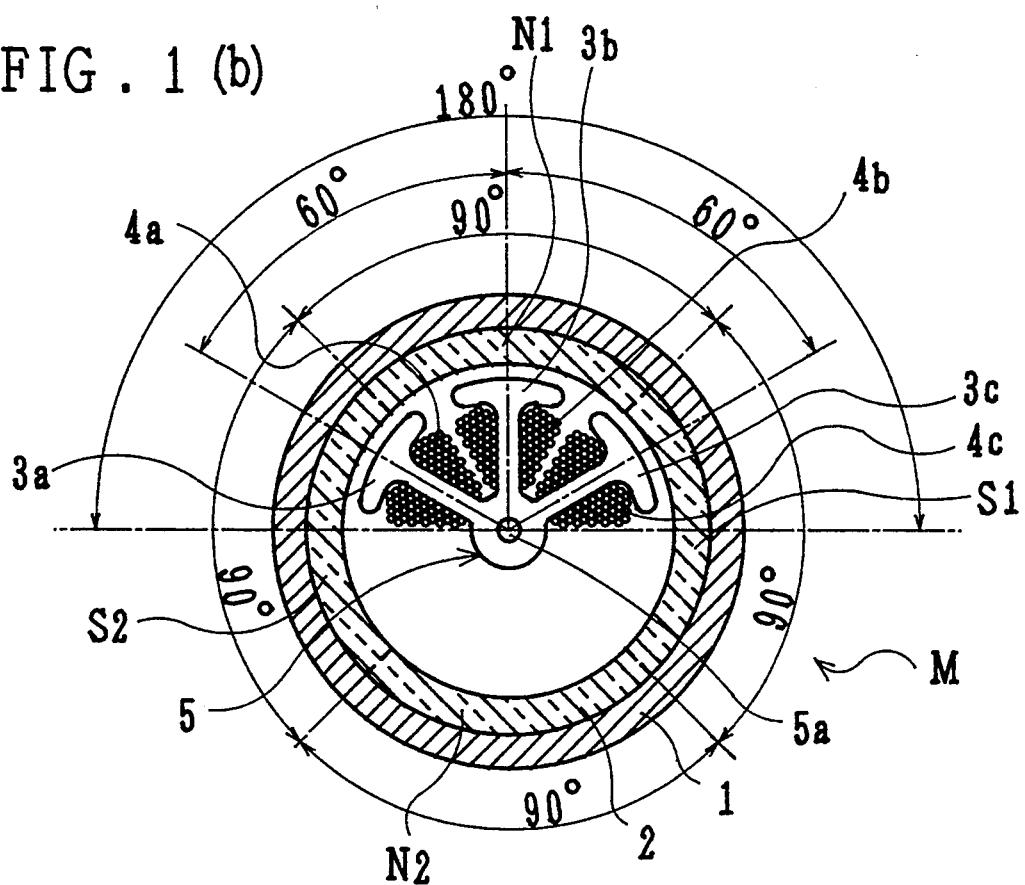
Figure 2:
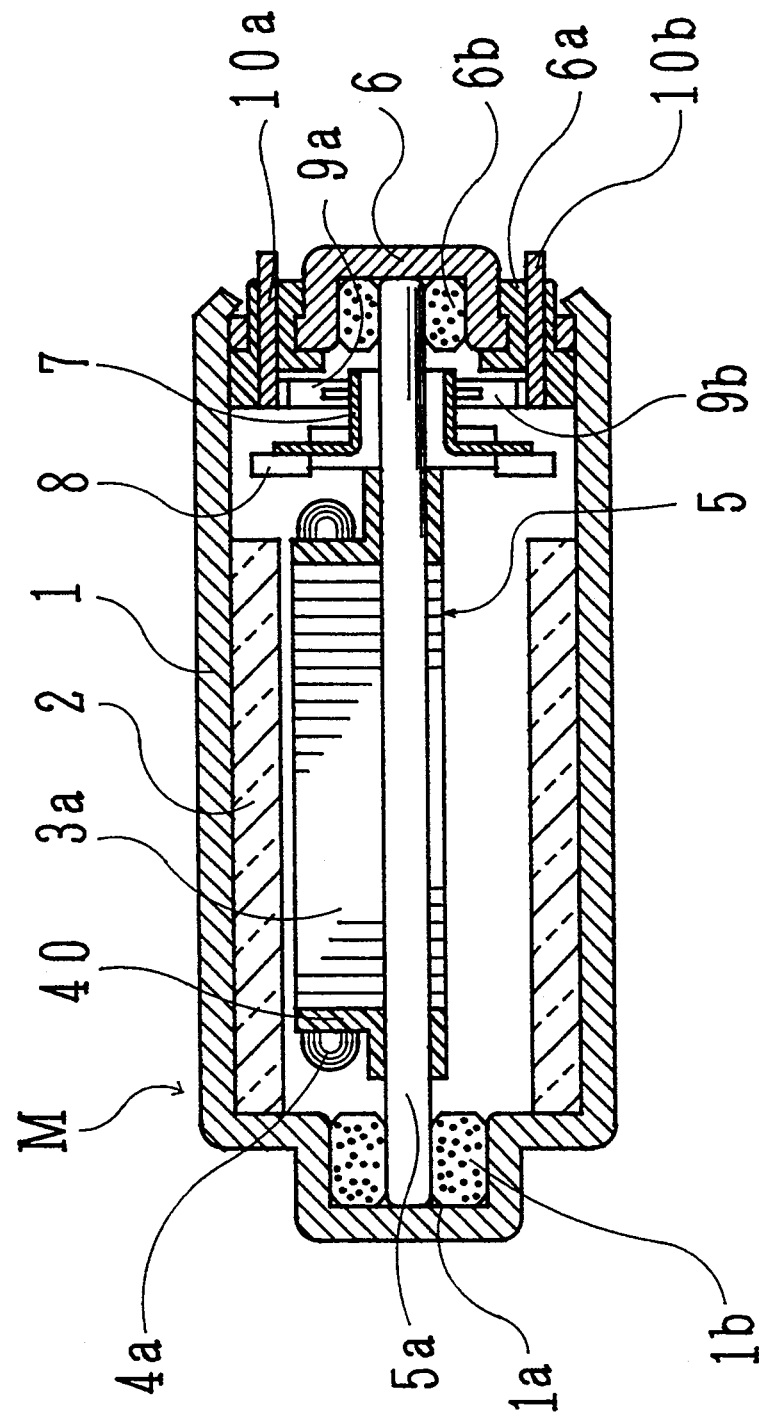
FIG. 2 is a longitudinal mid-sectional view of the vibrator motor shown in FIG. 1.

FIGS. 1 (a) and 1 (b) are cross sectional views of a micro vibrator motor of a first embodiment according to the present invention. FIG. 2 is a longitudinal mid-sectional view of the vibrator motor.

In FIGS. 1 (a), 1 (b) and 2, a vibrator motor M has a generally cylindrically-shaped case 1 and a four-pole ring-shaped permanent field magnet 2 securely attached to the inside of the case 1. The case 1 is made of a tin-plated steel and is also a path for the field magnetic flux of the magnet 2. The magnet 2 is made of a rare-earth-metal bonded by plastic (i.e. bonded magnet). One example of suitable material therefor is material No. CM8H of TDK Corp., Japan. Numeral 3 denotes a three-pole armature iron core having radially extending armature core poles 3a, 3b and 3c. Armature windings 4a, 4b and 4b are wound on the armature core poles 3a, 3b and 3c, respectively. The winding directions of all of the armature windings are the same. Numeral 5 denotes a rotor which includes a rotor shaft 5a in addition to the armature iron core 3 and the armature windings 4a, 4b, 4c.

The magnet 2 is divided into four arcuate alternate north and south pole sections, N1, S1, N2 and S2, which are disposed coaxially with the axis of the rotor shaft 5a at an even pitch angle of 90°. Although the magnet 2 in the present embodiment is integrally constructed, each pole section of the magnet 2 may be of a separate segment.

FIG 1(a) also shows imaginary core poles 3a', 3b' and 3c' in broken lines for positional reference purposes. Namely, the configuration of the actual armature iron core 3 plus the imaginary core poles 3a', 3b' and 3c' would constitute an ordinary 6-pole armature iron core where all of the core poles would be angularly evenly spaced. In the actual construction of the armature iron core 3 of the present invention, only the core poles 3a, 3b and 3c are existent and there is an angular interval of 60° between the radial central axes of the armature core poles 3a and 3b and between the radial central axes of the armature core poles 3b and 3c, as shown in FIG. 1 (b). Therefore, the angular interval between the radial central axes of the armature core poles 3a and 3c is 120° (i.e. 60°×2). The armature iron core 3 has a laminated construction as shown in FIG. 2.

Numeral 40 in FIG. 2 denotes armature covers, and the armature windings 4a, 4b and 4c are wound over the covers 40 as well as the respective winding arms of the core poles 3a, 3b and 3c.

Figure 3:
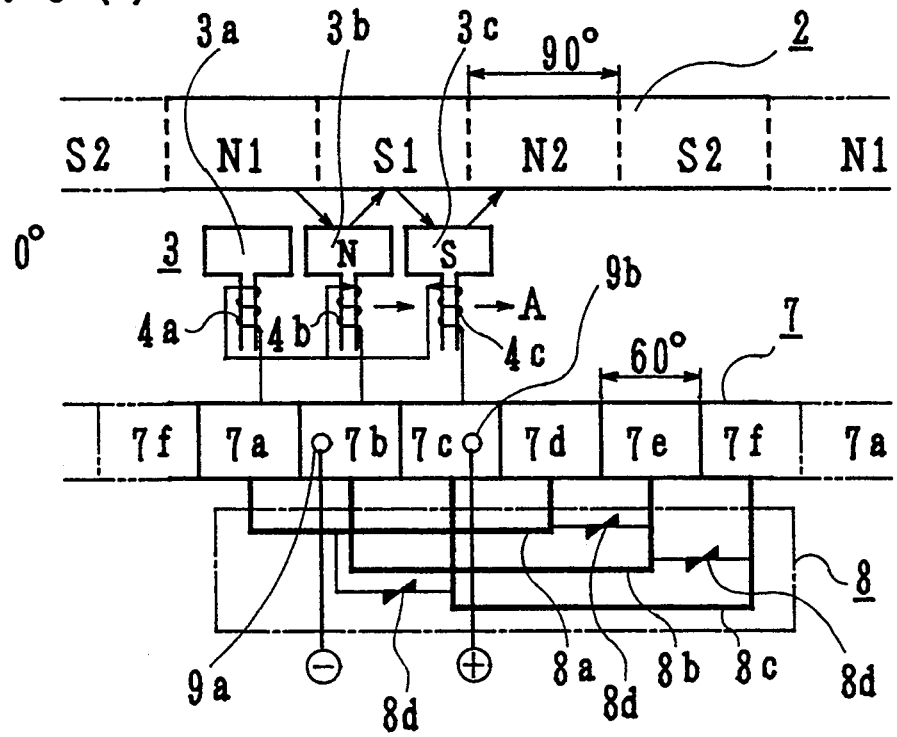
FIGS. 3(a) and 3(b) are semi-diagrammatical developed views explanatory of the principle of the rotation of the rotor of the vibrator motor shown in FIGS. 1(a), 1(b) and 2.
Figure 3:
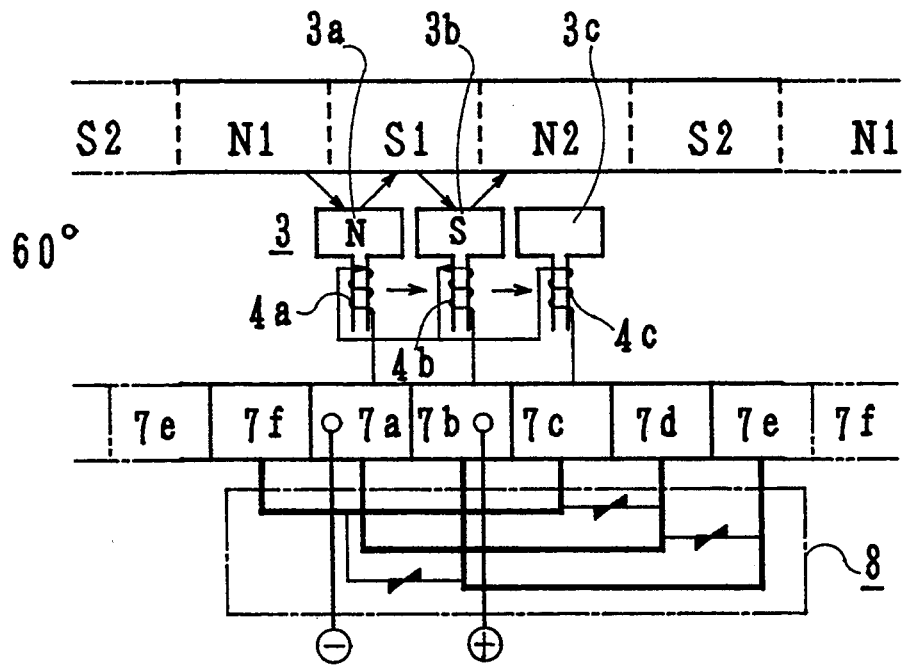

Referring to FIGS. 2 and 3(a), the case 1 has an open end and a closed end and has a shaft supporting hollow 1a in the diametrical center of the closed end. Numeral 6 denotes a shaft supporting bracket, which is disposed at the diametrical center of the open end of the case 1 and is fixed to the case 1 with an electrically insulating bracket support 6a. The rotor shaft 5a is rotatably supported by a pair of bearings 1b and 6b, where the bearing 1b is fixed to the shaft supporting hollow 1a and the bearing 6b is fixed to the shaft supporting bracket 6. Numeral 7 denotes a cylindrical commutator which consists of six arcuate commutator segments 7a, 7b, 7c, 7d, 7e and 7f disposed coaxially with the shaft 5a at an even angular pitch of 60°, (FIG. 3 (a)). Numeral 8 denotes a ring varistor. The ring baristor 8 includes three connecting conductors 8a, 8b and 8c and baristor elements 8d, whose equivalent circuit is shown in FIG. 3(a). The three diametrically opposing pairs of the commutator segments 7a–7d, 7b–7e and 7c–7f are individually short-circuited each other by the connecting conductors 8a, 8b, and 8c, respectively, as shown in FIG. 3(a). The baristor elements 8d are provided for the purpose of suppressing commutator sparks.

One end of each of the armature windings 4a, 4b and 4c are electrically connected to one another and the other end of each of the armature windings 4a, 4b and 4c are electrically connected to the commutator segments 7a, 7b and 7c, respectively, so that the armature windings 4a, 4b and 4b form a star (or, "Y") connection as shown in FIG. 3(a). Although not shown, the connection of the armature windings may alternatively be made in a delta connection.

Reference characters 9a and 9b denote a pair of brushes of opposite polarities which are slidably in contact with the commutator 7. The contact points of the brushes 9a and 9b against the surface of the commutator 7 are angularly 90° apart from each other (refer to FIG. 3). Reference characters 10a and 10b denote a pair of lead terminals electrically connected to the brushes 9a and 9b, respectively.

Next, the principle of the rotation of the rotor 5 of the vibrator motor M will be explained in reference to FIGS. 3(a) and 3(b). In FIG. 3(a), the rotational angular position of the rotor 5 is assumed to be 0, and, in FIG. 3(b), the rotational angular position of the rotor 5 is assumed to be 60°.

When the motor is energized with a dc power through the terminals 10a and 10b in the polarity shown in FIG. 3(a); first, at the rotational angular position 0° of the rotor 5, electric current flows through the armature windings 4b and 4c in the directions indicated by the respective arrows. Then, the armature poles 3b and 3c are magnetized in north and south polarities, respectively. Therefore, the armature pole 3b is attracted by the field magnet section S1 and repelled by the section N1. At the same time, the armature pole 3c is attracted by the field magnet section N2 and repelled by the section S1. Consequently, a torque is produced in the rotor 5 in the direction of the arrow A.

Referring now to FIG. 3(D), after the rotor 5 has rotated by 60° and has come to the angular position of 60° electric current flows through the armature windings 4a and 4b in the directions indicated by the respective arrows and the armature poles 3a and 3b are accordingly magnetized in north and south polarities respectively. Therefore, the armature pole 3a is repelled by the magnetic section N1 and attracted by the section S1. At the same time, the armature pole 3b is repelled by the magnetic section S1 and attracted by the section N2. Therefore, the torque produced in the rotor 5 is still in the same direction indicated by the arrow A. No torque is produced in the reverse direction at any other rotational angular positions of the rotor 5, but the torque is produced in a cyclic manner always in the same direction. Therefore, the rotor 5 maintains its rotation as long as the dc power is supplied.

It goes without saying that the shape and the width of the blades of the armature poles 3a, 3b, 3c will be determined based on an optimum design.

The second embodiment of the vibrator motor according to the present invention will now be explained in reference to FIG. 4.

The basic construction and the principle of the vibrator motor of the second embodiment are the same as those of the first embodiment. In the second embodiment, the number and the angular arrangement (i.e. angular pitch) of the armature poles, the number and the connections of the armature windings, the number and the angular arrangement of the pole sections of the field magnet, the number and the angular arrangement of the commutator segments, the short-circuiting connections among groups of commutator segments and the angular interval between the contact points of the commutator brushes are different from those of the first embodiment. Therefore, any other parts or the state of the vibrator motor of the second embodiment not particularly explained here should be regarded as the same as those of the first embodiment.

Figure 4:
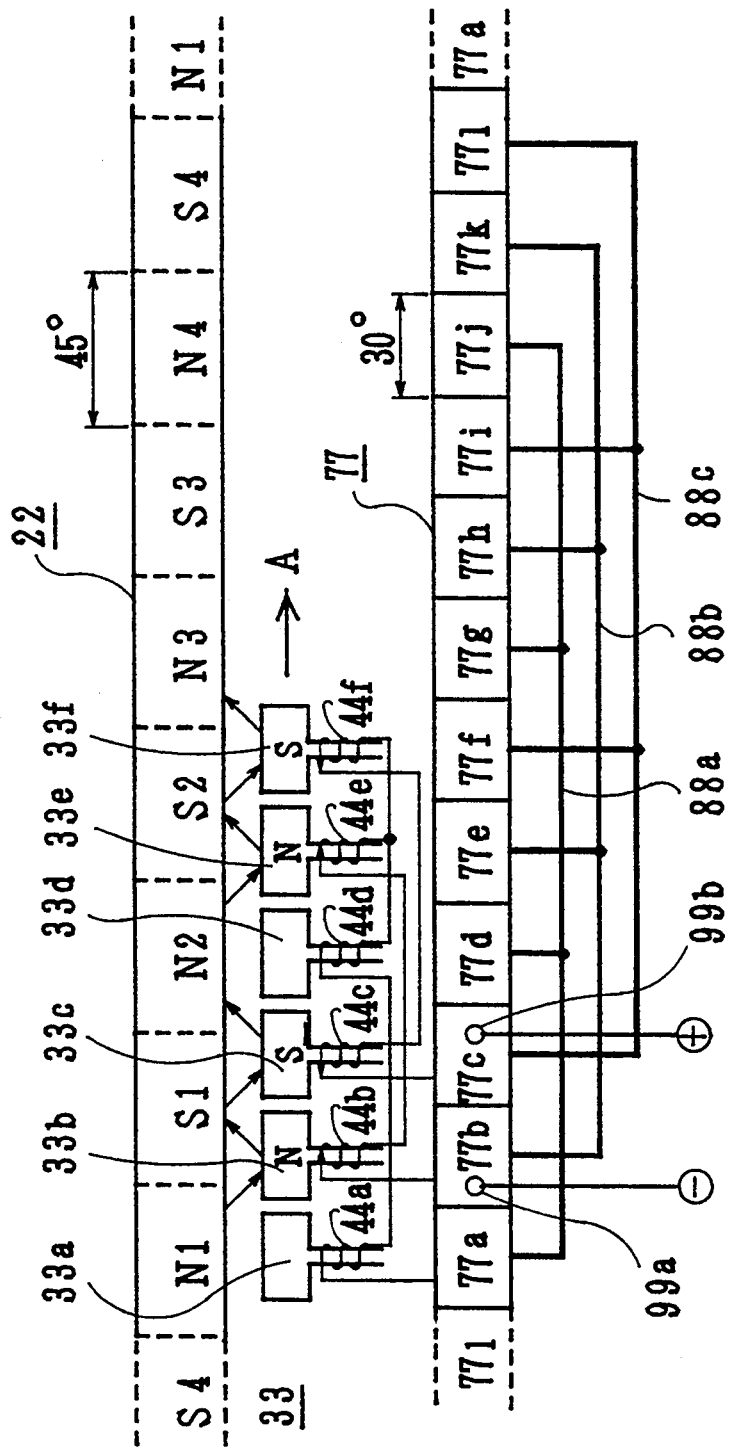
FIG. 4 is a semi-diagrammatical developed view of a substantial part of a vibrator motor of a second embodiment according to the present invention.
Figure 5:
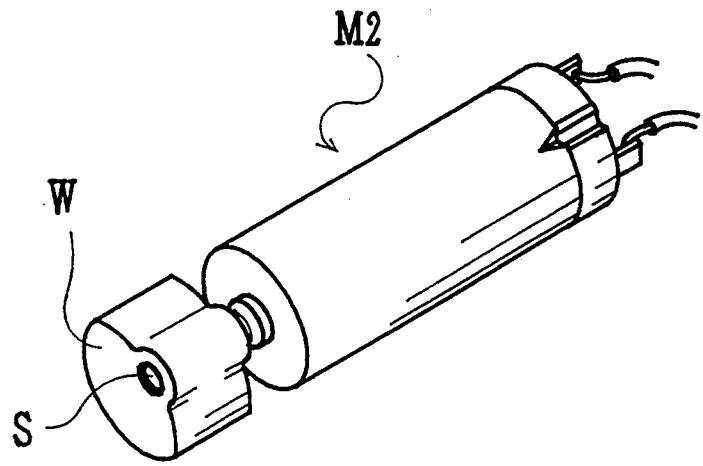
FIG. 5 is a perspective view of a prior known vibrator motor having an output shaft and an external eccentric weight.
Figure 6:
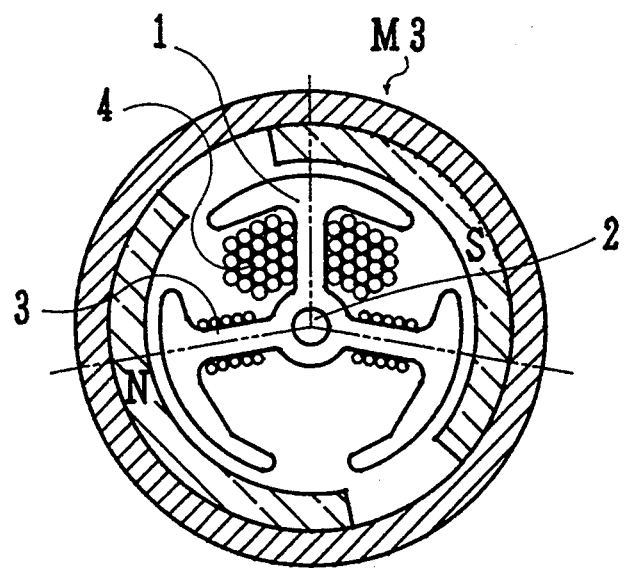
FIG. 6 is a cross-sectional view of another vibrator motor, the invention of which has been assigned to the same assignee as of the present application.

FIG. 4 is a semi-diagrammatical developed view of a substantial part of a vibrator motor of the second embodiment. In FIG. 4, a cylindrically-shaped field magnet 22 has eight alternate north and south pole sections, N1, S1, N2, S2, N3, S3, N4 and S4. The pole sections of the field magnet 22 are disposed at an even angular pitch of 45° (i.e. 360° /8). An armature rotor 33 has six armature core poles 33a, 33b, 33c, 33d, 33e and 33f which have armature windings 44a, 44b, 44c, 44d, 44e and 44f, respectively. The winding directions of all of the armature windings are the same. The angular interval between the radial central axes of any pair of armature core poles adjacent to each other is 30°. Therefore, the angular interval between the radial central axes of the armature poles 33a and 33f is 150° (30°33 5). A commutator 77 has twelve commutator segments 77a, 77b, 77c, 77d, 77e, 77f, 77g, 77h, 77i 77D, 77k and 77l arranged at an even angular pitch of 30°. Each pair of the armature windings 44a–44d, 44b–44e and 44c–44f is electrically connected in series. One end of each of the serially connected windings 44a–44d, 44b–44e and 44c–44f is connected to each of the commutator segments 77a, 77b and 77c, respectively. The other ends of the serially connected windings 44a–44d, 44b–44e and 44c–44f are connected together in a star connection. Each of the three groups of the four commutator segments 77a–77d–77g–77j, 77b–77e–77h–77k and 77c–77f–77i–77l are individually short-circuited with conductors 88a, 88b and 88c, respectively. The contact points of commutator brushes 99a and 99b have an angular interval of 45°.

In FIG. 4, the rotor 33 is at a rotational angular position where the armature poles 33b, 33c, 33e and 33f are magnetized in the polarities as shown to interact with the respective opposing field magnet pole sections, in a similar manner to the case of the first embodiment, so that the rotor 33 rotates in the direction indicated by the arrow A. As in the case of the first embodiment, the torque is produced always in the same rotational direction regardless of the rotational angular position of the rotor 33.

The effect of the vibrator motor of the present invention will now be explained. The radial axes of all of the armature poles of the vibrator motor, in both the first and the second embodiments, are disposed angularly within 180° about the axis of the rotor shaft. Therefore, the center of the mass of the rotor is situated radially substantially off the axis of the rotor shaft. Thus, a large unbalanced centrifugal force is produced during the rotation of the rotor, thereby causing a vibration of a large amplitude of the motor. On the other hand, since the field magnet has at least four pole sections, and the rotor has at least three armature poles having an angular interval of no more than 30° between an adjacent pair thereof, the cogging effect of the rotor is minimized, and, therefore, a comparatively small cogging torque is required to drive the motor. This means that a low voltage power can operate the motor.

Furthermore, since the motor has neither external eccentric weight nor output shaft, the alerting device employing this motor can be designed compact, and there is no danger of interference between a rotating eccentric weight and any other parts contained in the alerting device.

It will be understood that various changes and modifications may be made in the above described embodiments which provide the characteristics of the present invention without departing from the spirit and principle thereof particularly as defined in the following claims.

What is claimed is:

1. A dc vibrator motor, comprising:
   (a) a generally elongated case;
   (b) an axially elongated armature rotor including a shaft, said armature rotor having a first armature pole, a second armature pole and a third armature pole, each of said first, said second and said third armature poles having a radial central axis and an armature winding, said armature poles being angularly arranged about an axis of said shaft in such a manner that there is an angular interval of 60° between the radial central axes of said first armature pole and said second armature pole and there is an angular interval of 60° between the radial central axes of said second armature pole and said third armature pole so that the angular interval between the radial central axes of said first armature pole and said third armature pole is 120° and the center of mass of said rotor is thereby radially off the axis of said shaft, said armature rotor further including a commutator disposed coaxially with said shaft, said commutator having a total of six commutator segments arranged at an even angular pitch of 60°;
   (c) a permanent field magnet disposed inside said case coaxially with said shaft, said field magnet having a total of four alternate north and south field magnetic poles arranged at an even angular pitch of 90°; and (d) a pair of commutator brushes disposed slidably in contact with said commutator.

2. A dc vibrator motor, comprising:
(a) a generally elongated case;
(b) an axially elongated armature rotor including a shaft, said armature rotor having a total of six armature poles, each of said six armature poles having radial central axis and an armature winding, said six armature poles being angularly arranged about an axis of said shaft in such a manner that there is an angular interval of 30° between the radial central axes of any pair of said armature poles adjacent to each other so that the radial central axes of all of the six armature poles are within an angular range of 150° and the center of mass of said rotor is thereby radially off the axis of said shaft, said armature rotor further including a commutator disposed coaxially with said shaft, said commutator having a total of twelve commutator segments arranged at an even angular pitch of 30°;
(c) a permanent field magnet disposed inside said case coaxially with said shaft, said field magnet having a total of eight alternate north and south field magnetic poles arranged at an even angular pitch of 45°; and
(d) a pair of commutator brushes disposed slidably in contact with said commutator.

3. A dc vibrator motor, comprising:
(a) a generally elongated case;
(b) an axially elongated armature rotor rotatably disposed in said case, said armature rotor having a shaft and an armature core fixedly mounted on said shaft, said armature core having at least three and at most six armature poles and a corresponding number of armature windings, each of said armature poles having a radial central axis, said armature poles being disposed in such a manner that all of the central axes of said armature poles are within a 180° angular range about an axis of said shaft said armature rotor further including a commutator, said commutator having a total of at least six and at most twelve commutator segments arranged at an even angular pitch about the axis of said shaft;
(c) a permanent field magnet disposed inside said case coaxially with said shaft, said field magnet having a total of at least four and at most eight alternate north and south field magnetic poles arranged at an even angular pitch about the axis of said shaft; and
(d) a pair of commutator brushes disposed slidably in contact with said commutator.

4. A dc vibrator motor according to claim 3, wherein the central axes of any pair of said armature poles adjacent to each other have an even angular interval.

* * * * *